United States Patent
Pathak et al.

(10) Patent No.: US 9,645,708 B2
(45) Date of Patent: May 9, 2017

(54) USER INTERFACE METHOD FOR MODIFYING A SELECTION LIST OF ITEMS TO ADD OR REMOVE ITEMS WHILE INDICATING ORIGINAL SELECTION

(71) Applicant: KONICA MINOLTA LABORATORY U.S.A., INC., San Mateo, CA (US)

(72) Inventors: Rabindra Pathak, San Jose, CA (US); Katsuyuki Taima, Redwood City, CA (US); Akinori Yamamoto, Santa Clara, CA (US); William Chang, Mountain View, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 344 days.

(21) Appl. No.: 14/257,749

(22) Filed: Apr. 21, 2014

(65) Prior Publication Data
US 2015/0248195 A1  Sep. 3, 2015

Related U.S. Application Data

(63) Continuation-in-part of application No. 14/194,641, filed on Feb. 28, 2014, now abandoned.

(51) Int. Cl.
*G06F 3/0482* (2013.01)
*G06F 3/0484* (2013.01)
*H04N 1/00* (2006.01)

(52) U.S. Cl.
CPC ........ *G06F 3/0482* (2013.01); *G06F 3/04842* (2013.01); *H04N 1/00411* (2013.01);
(Continued)

(58) Field of Classification Search
CPC .. G06F 3/0482; G06F 3/04842; G06F 3/0488; H04N 1/00461; H04N 1/00482; H04N 1/00437; H04N 1/00413
(Continued)

(56) References Cited

U.S. PATENT DOCUMENTS

| 8,340,346 B2 | 12/2012 | Saito |
| 9,118,617 B1 | 8/2015 | Giroux |

(Continued)

OTHER PUBLICATIONS

Canon U.S.A., Inc., "Safeguarding Information Within Documents and Devices", "http://www.usa.canon.com/CUSA/assets/app/pdf/ISG_Security/brochure_run_iradv_security_.pdf", 8 pages, printed from the internet on Feb. 28, 2014.

(Continued)

*Primary Examiner* — Nicholas Ulrich
(74) *Attorney, Agent, or Firm* — Chen Yoshimura LLP

(57) ABSTRACT

A user interface display method implemented on a computer-controlled device to allow an operator to define a list of selected items among a plurality of items available for selection. The operator starts by selecting a pre-existing list containing a number of selected items. A modified list is generated which initially contains the same items as the pre-existing list. The device displays all of the items available for selection, as well as first and second indications associated with each item initially in the modified list. Then, in response to operator inputs to add items to (or remove items from) the modified list, second indications are displayed (or removed from display) in association with the items to be added (or removed), without changing the display of any of the first indications and any of the plurality of items. The modified list is saved without changing the pre-existing list.

12 Claims, 4 Drawing Sheets

(52) U.S. Cl.
CPC ..... *H04N 1/00413* (2013.01); *H04N 1/00482* (2013.01); *H04N 2201/3246* (2013.01)

(58) Field of Classification Search
USPC .................................. 715/845, 821, 822, 823
See application file for complete search history.

(56) References Cited

U.S. PATENT DOCUMENTS

| | | | |
|---|---|---|---|
| 2005/0008163 | A1 | 1/2005 | Leser et al. |
| 2006/0020599 | A1* | 1/2006 | Martin, Jr. .......... G06F 21/6218 |
| 2006/0265760 | A1* | 11/2006 | Daemke ................ G06F 21/604 726/27 |
| 2007/0088788 | A1 | 4/2007 | Goldberg et al. |
| 2007/0133044 | A1 | 6/2007 | Tanaka |
| 2007/0265854 | A1 | 11/2007 | Wilbrink et al. |
| 2007/0271592 | A1 | 11/2007 | Noda et al. |
| 2008/0261569 | A1* | 10/2008 | Britt ..................... G06Q 10/107 455/414.1 |
| 2010/0325686 | A1 | 12/2010 | Davis et al. |
| 2011/0007348 | A1 | 1/2011 | Yamaizumi |
| 2011/0037998 | A1 | 2/2011 | Hoshino |
| 2012/0192267 | A1 | 7/2012 | Aizawa |

OTHER PUBLICATIONS

Adobe Systems Incorporated, "Adobe LiveCycle ES3 Overview: Rights Management", http://help.adobe.com/en_US/livecycle/10.0/Overview/WS92d06802c76abadb2c8525912ddcb9aad9-7ff8.html, 7 pages, printed from the internet on Apr. 15, 2014.
Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.
Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

* cited by examiner

Please select a rights management
policy for this document:

| Team X | Project Y |
| Accounting | Research |
| Managers | All |

Users granted viewing right under
the selected policy:

Policy name: Project Y

Users: Amy, Carl, David, Frank

[OK] [Add/ Remove]

Fig. 3B

Select/unselect users:

| ☑ Amy | ☐ Erin |
| ☐ Brian | ☑ Frank |
| ☑ Carl | ☐ George |
| ☑ David | ☐ Henry |

...
[OK] [Cancel]

Fig. 3C

Select/unselect users:

| ☑ Amy | ☑ Erin |
| ☐ Brian | ☑ Frank |
| ☐ Carl | ☐ George |
| ☑ David | ☐ Henry |

...
[OK] [Cancel]

Fig. 3D

Select a policy:

| Team X |
| Project Y |
| Research |
| Accounting |

...

Select/unselect users:

| ☑ Amy | ☐ Erin |
| ☐ Brian | ☑ Frank |
| ☑ Carl | ☐ George |
| ☑ David | ☐ Henry |

...
[OK] [Cancel]

Fig. 3E

USER INTERFACE METHOD FOR MODIFYING A SELECTION LIST OF ITEMS TO ADD OR REMOVE ITEMS WHILE INDICATING ORIGINAL SELECTION

BACKGROUND OF THE INVENTION

Field of the Invention

This invention relates to a user interface, and in particular, it relates to a user interface for modifying a selection list for selecting items.

Description of Related Art

The user interface devices of many computer controlled devices use display screens that are much smaller than conventional laptop or desktop computers and user input devices that are more limited than a full keyboard and mouse. Meanwhile, users of these devices are sometimes required to perform rather complex tasks that involve display of a relatively large amount of information.

For example, for most multi-function printers (MFPs), the user interface panel is a touch screen with a limited display space. MFPs are machines that ingrate printing, scanning and copying functions; some of them also have email and fax functions that can be used to send scanned documents to various destinations. Some MFPs can be connected with servers that implement digital rights management. On these devices, a user may be required to perform relatively complex tasks related to digital rights managements (DRM or RMS) using the user interface panel on the MFP. For example, when scanning a document, the user may be required to set digital rights for the scanned document, which may require defining the permission levels of multiple users of the DRM system.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server. When an operator uses the scanner to scan a hardcopy document into a digital document, the scanner prompts the operator to specify a rights management policy to be associated with the digital document.

SUMMARY

Embodiments of the present invention provides a user interface display method that allows an operator to modify an original list of selected items to add more items to the list and/or remove items from the list, in a manner that indicates both the items that are in the original list and items that are currently selected, among all items that are available for selection.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a user interface display method implemented on a computer-controlled device having a display screen and a user input device, which includes: (a) storing a plurality of items available for selection and one or more lists each defining a subset of the plurality of items; (b) in response to a first operator input via the user input device which indicates one of the one or more lists as a selected list, creating a modified list containing a plurality of initially selected items which are identical to the subset of items defined by the selected list; (c) displaying on the display screen the plurality of items, a plurality of first indications each associated with one of the initially selected items, and a plurality of second indications each associated with one of the initially selected items; (d) receiving an second operator input which indicates either an addition of a selected one of the plurality of items to the modified list, or a removal of a selected one of the plurality of item from the modified list, or a confirmation of the modified list; (e1) if the second operator input indicates an addition, displaying a second indication associated with the selected item, without changing any of the first indications and without changing any of the displayed items, and adding the selected item to the modified list; (e2) if the second operator input indicates a removal, removing a display of the second indication associated with the selected item, without changing any of the first indications and without changing any of the displayed items, and removing the selected item from the modified list; and (e3) if the second operator input indicates a confirmation, saving the modified list without changing the selected list.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF THE DRAWINGS

FIGS. 3A to 3E schematically illustrate the display on the MFP during various steps of the process of FIG. 2.

DETAILED DESCRIPTION OF PREFERRED EMBODIMENTS

The present invention relates to a user interface display method that is useful in particular on user interface panels that have a limited display size. The method is described using examples in the context of a scanner (e.g. an MFP) that implements digital rights management (DRM) functions. It should be appreciated that while detailed steps of the DRM method are described, they are not essential and are not a part of the invention; the DRM method is merely used as an example to illustrate the invention which pertains to the user interface display.

The DRM functions require an operator to apply a protection policy to a document being scanned, where the policy defines which users are to be granted what access rights to the document, and add new users or remove existing users from the policy to define the access rights of users with respect to the document. Specifically, embodiments of the present invention provide a digital rights management method that allows the operator of a scanner to associate a digital document with user access rights that are different from the rights defined in any of the existing policies. More specifically, the method allows the operator to choose one of the existing policies stored on the RMS server, and modify the user access rights by granting rights to additional users and/or removing rights of some users that would be granted by that policy, to generate modified user access rights for a particular digital document without changing the policy itself. For example, the operator can choose policy #2 which grants viewing right to users A, B and C only, then specifies viewing right to be granted to additional user D, while removing user C's viewing right. As a result, users A, B and D only are granted viewing right for the digital document. The method can accomplish this result without modifying the policies that are already stored on the RMS server.

Figure 1:
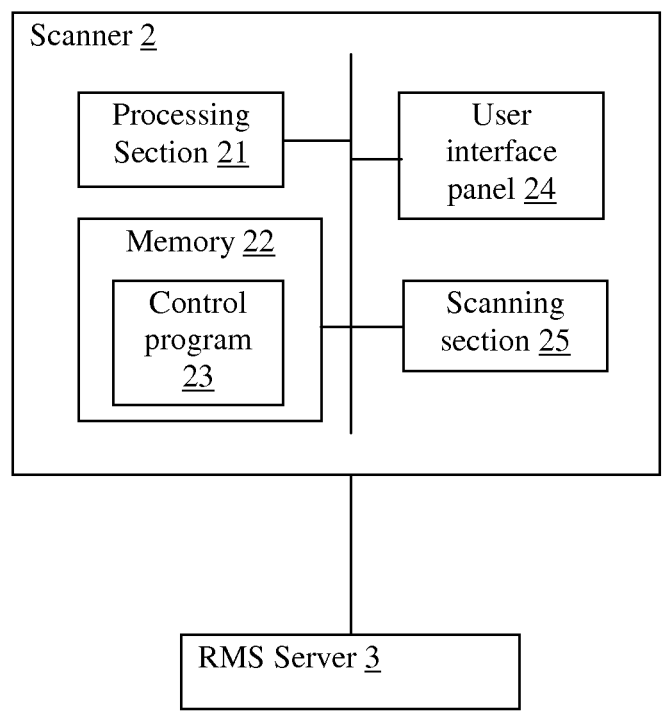
FIG. 1 schematically illustrates a scanner or MFP in which embodiments of the present invention may be implemented.

FIG. 1 schematically illustrates a digital rights management system (DRM or RMS) according to an embodiment of the present invention. The system includes a scanner device 2 and a digital rights management server (RMS server) 3 connected to the scanner device. The scanner device 2 includes a processing section 21, a memory 22 storing a control program 23, a user interface panel 24, and a scanning section 25 which includes hardware that performs the scanning functions. The processing section 21 executes the control program 23 to control the various functions of the scanner 2, including various steps of the digital rights management method described later. The scanner 2 is connected to the RMS server 3 via a network or other type of connections. The server 3 includes suitable hardware and software not shown in the drawings.

Figure 2:
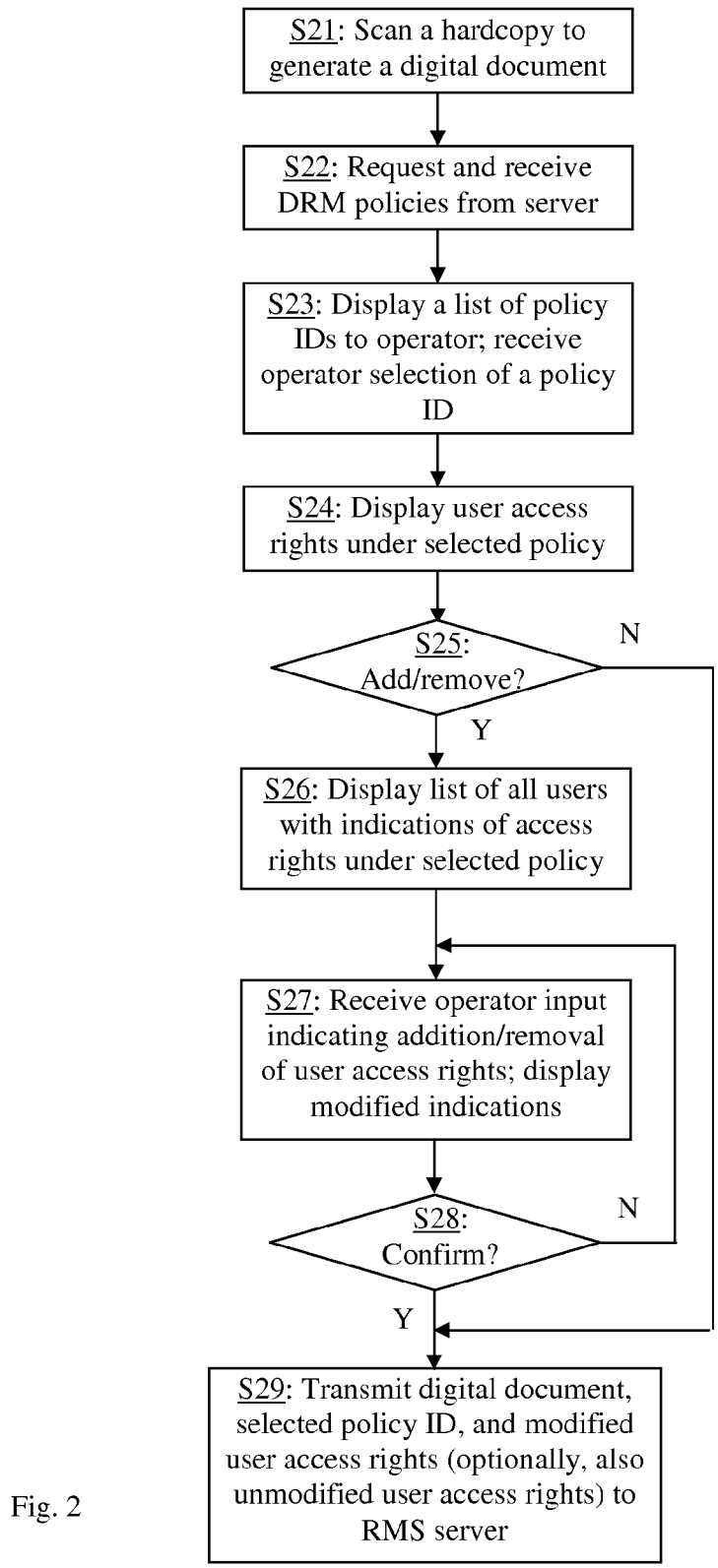
FIG. 2 schematically illustrates a method executed by the scanner MFP when scanning a document and attaching digital rights to the scanned document.

FIG. 2 schematically illustrates a digital rights management method implemented in the scanner according to an embodiment of the present invention. In this process, the user interface panel 24 is used to display various information to the operator and to receive operator input. The user interface panel 24 maybe, for example, a touch panel or other types of interface device.

The process begins when an operator uses the scanner to scan a hardcopy document and request rights protection for the scanned document (step S21). In this embodiment, the scanning step, which generates a scanned digital document, is a part of step S21; alternatively, actual scanning can be performed later, e.g. just before step S29. The scanner obtains the DRM policies and a list of all registered users of the DRM system from the server (step S22). In the illustrated embodiment, the policies and the registered users list are maintained by the server 3, and provided to the scanner 2 upon request. In an alternative embodiment, the policies and the registered users list are stored on the scanner locally (and therefore step S22 is omitted).

Each DRM policy has a policy ID and specifies various policy terms, including user access rights, i.e., which user is granted what rights (view, edit, print, copy, etc.), and other optional policy terms. For example, in a large organization, policies can be configured to grant access rights to users within business units, users having certain job titles, etc. The policies may have user-friendly IDs (names) such as "Project X," "Team Y," "Managers," etc. The user access rights within each policy will specify a list of user names and rights granted to each user.

After obtaining the policies, the scanner 2 displays a list of policies (by ID) to the operator, and the operator selects one of the displayed policies (step S23). FIG. 3A schematically illustrates an exemplary display for step S23, which allows the operator to select a policy using the labeled buttons. The scanner then displays a list of users currently granted access rights under the selected policy, including an option allowing the operator to request to add/remove (i.e. modify) user rights (step S24). FIG. 3B schematically illustrates an exemplary display for step S24, showing a list of users having viewing right granted under the selected policy "Project Y", and an "Add/Remove" button that allows the operator to request modifications. Viewing right is used in this example, but other rights may be specified as well.

If the operator requests to modify user rights ("Y" in step S25), the scanner displays a list of all registered users of the system, with indications of which users are currently granted access rights under the selected policy (step S26). This display also allows the operator to select additional users to be granted access right and/or remove rights from users that are currently granted the rights. FIG. 3C schematically illustrates an exemplary display for step S26. In this display, the names of all registered users are listed (a tool such as a scroll bar or alphabetical index may be provided when the number of users is large), with a checkbox next to each user indicating whether rights (viewing right in this example) is to be granted to that user. In addition, users originally granted rights under the selected policy are highlighted (as shown by thicker lines in this illustration). The highlighting may be done by using different colors, thicker borders, underlines, etc.

Using the display of step S26, the operator selects and/or unselects user names (e.g. check and/or uncheck the boxes), and the display panel displays the modified selection indication interactively (step S27). FIG. 3D schematically illustrates an example of the operator's select/unselect result, where user Carl is now unselected and user Erin is now selected. In a preferred embodiment, as the operator selects and unselects users, the users that are originally granted access rights under the selected policy remain highlighted regardless of selection/unselection, so that the operator can easily see how his modified user list compares to the original user list under the selected policy. Thus, for example, in FIG. 3D, user Carl is unselected but still highlighted, and user Erin is selected but not highlighted.

When the operator is satisfied with his selections and presses the "OK" button in the display shown in FIG. 3D, the scanner displays a confirmation screen which may be similar to FIG. 3B but now showing the modified list of users with rights, and receives a confirmation instruction from the operator ("Y" in step S28). The scanner then transmits the scanned digital document to the RMS server 3, along with the selected policy ID and the modified user access rights (step S29).

In one embodiment, if in step S25 the operator did not request to modify the user access rights (e.g., the operator presses the "OK" button on the display of FIG. 3B) ("N" in step S25), or in step S27 the operator did not change any user access rights, then the scanner will directly transfer the scanned digital document and the selected policy ID to the server, with an indication that no modified user access rights is present (step S29).

It is noted that in step S24, the display of user list under the selected policy (FIG. 3B) makes it convenient for the operator to decide whether he wants to modify the user access rights or not, but this display is optional. In an alternative embodiment, steps S24 and S25 are omitted;

instead, after the operator selects a policy ID in step S23 (using the screen shown in FIG. 3A), the scanner directly proceeds to step S26 to display the user rights modification screen e.g. FIG. 3C. Likewise, the confirmation step S28 can also be omitted.

In another alternative embodiment, the display of a list of policies and a list of users are combined on the same display screen, and the displays and operator inputs for steps S23, S26, and S27 can be done using the same screen. An example of this is shown in FIG. 3E. In this embodiment, the initial display of step S23 has a list of policies, but no policy is highlighted; and a list of users is presented on the same screen, but no user is selected and no user is highlighted. A tool such as a scroll bar or alphabetical index may be provided when the number of policies or number of users is large. Then, the operator selects a policy, e.g. by clicking on one of the listed policies. Steps S24 and S25 are omitted. Step S26 displays indications of which users have access right under the selected policy, e.g. by checking the checkboxes next to the names for these users, and also highlights these users. FIG. 3E shows an exemplary display of this step, where the policy "Project Y" has been selected (it is highlighted), and users Amy, Carl, David and Frank are shown as being granted rights under this policy. Then, the operator performs addition/removal of users, by selecting/unselecting users from the displayed list, e.g. by checking/unchecking the corresponding checkboxes nest to the users. The highlight for the users that are originally granted access rights by the selected policy will remain unchanged regardless of the addition and removal of users. Thus, for example, if the operator unselects user Carl and selects user Erin, the user list on the right hand side of FIG. 3E will resemble that shown in FIG. 3D, with user Carl unselected but still highlighted and user Erin selected but not highlighted. After the operator is satisfied with the user selection, the operator can confirm it and proceed to the next step by clicking the OK button (step S28).

Although the specific example described above is in the context of scanners and digital rights management, the method of modifying a list of selected items can be applied in any context. A user interface method executed by a computer-controlled device for allowing an operator to modify an original list of selected items, as applied to a general context, is described with reference to FIG. 4. In this method, the user interface device includes a display screen and a user input device. The user input device may be the display screen itself when a touch screen is used, a pointer device that moves a cursor on the display screen, a number of hardware buttons, etc.

Figure 4:
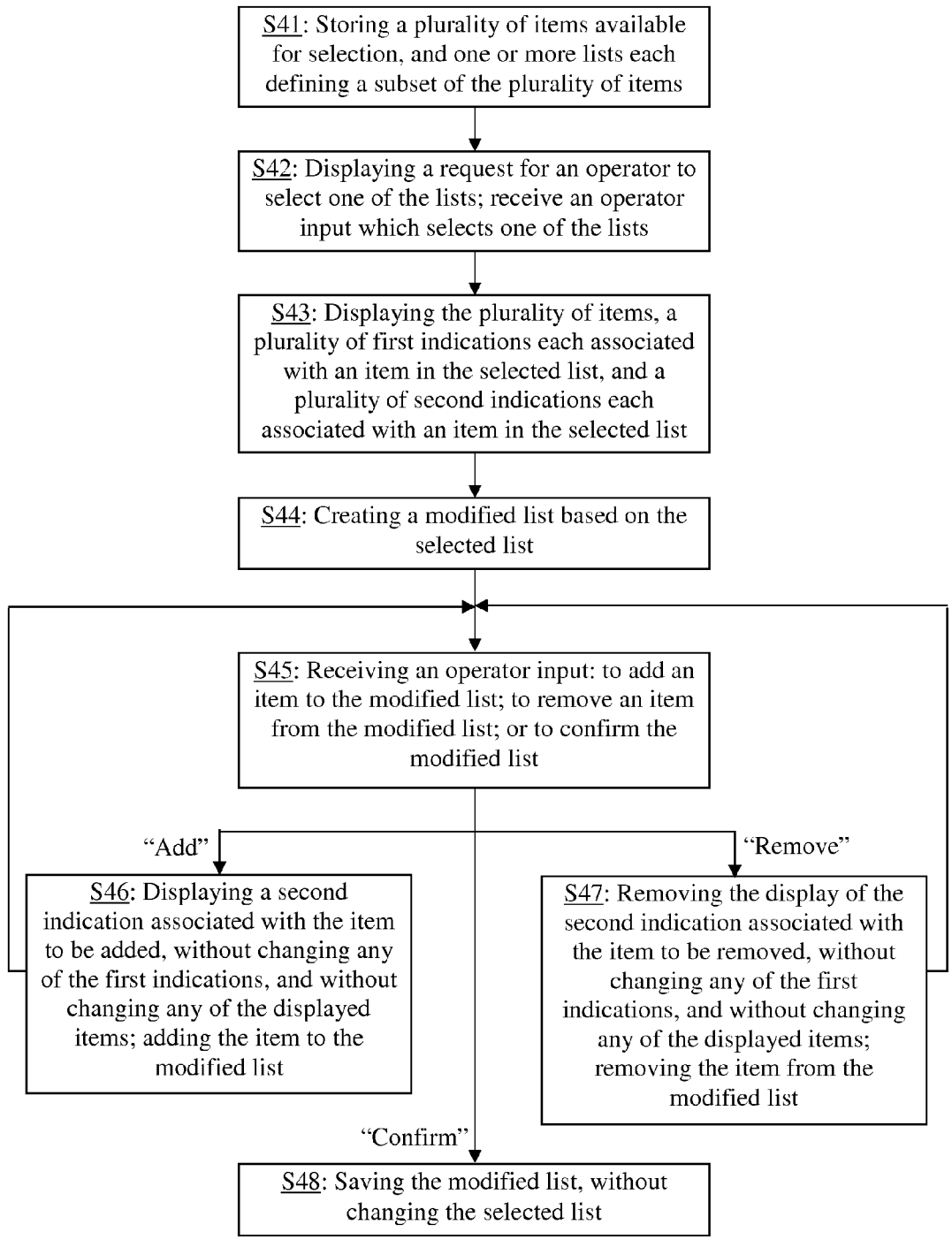
FIG. 4 schematically illustrates a user interface method executed by a computer-controlled device for modifying an original list of selected items.

As show in FIG. 4, the computer-controlled device stores a plurality of items available for selection, and stores one or more lists each defining a subset of the plurality of items (step S41). The item can be generally anything; example of which are the user names in the specific example described earlier. Examples of the lists defining a subset of the items are the rights management policies. The device displays request for an operator to select one of the pre-existing lists, and in response, receive an operator input which selects one of the lists (step S42). An example of the display in step S42 is that shown in FIG. 3A, where the device displays buttons each corresponding to a list, and the operator can select a list by clicking or touching one of the buttons.

In response to the operator's selection of a list, the device displays all of the plurality of items, along with a plurality of first indications each associated with an item in the selected list, and a plurality of second indications each associated with an item in the selected list (step S43). In other words, the initially selected items each have both a first indicator and a second indicate associated with them, and initially non-selected items do not have either indicator associated with them. An example of the display in step S43 is that shown in FIG. 3C. In this example, each item (user name) is displayed as a box with the user name; the first indications are the thick border of some of the boxes, and the second indications are the checkmarks in the checkboxes next to some of the users' names. Other display effects can be used for the first and second indicators, such as different filling colors of the boxes (highlight), a different font of the box labels (e.g. the user names) such as a bold font, underlines for the box labels, a flashing effect of the boxes, etc. Any display effects can be used as the first and second indications, as long as the first and second indications are different.

When the items are numerous and cannot fit in one screen, suitable tools may be used to manage the display, such as scroll tools to scroll the display items, multiple pages with buttons to move to the next or previous page or a particular page number, an alphabetical index or other index, etc. For example, is an alphabetical index is used, when the operator clicks on an alphabet, items (e.g. user names) that start with that alphabet are displayed. Using these display methods, even though all items are not displayed on the same screen, the display is considered a display of all of the plurality of items within the meaning of this disclosure.

The device also creates a modified list based on the selected list (step S44). When the modified list is initially created, it is identical to the selected list, i.e. it contains the same items that are in the selected list. Then, the operator inputs commands to add items to or remove items from the modified list (step S45). This may be done, for example, by touching or clicking on the labeled boxes or the check boxes associated with the items. In one implementation, if the operator touches an item that is currently not a selected item of the modified list, the touch is interpreted as a command to add the item to the modified list, and if the operator touches an item that is currently a selected item of the modified list, the touch is interpreted as a command to remove the item from the modified list.

In response to an "add" command, the device displays a second indication associated with the item to be added, without changing any of the first indications, and without changing any of the displayed items; it also adds the item to the modified list (step S46). An example of the display in step S46 is that shown in FIG. 3D, where a second indication (check mark in the check box) associated with the item "Erin" is displayed. None of the first indications (the thicker border in this example) is changed, and none of the displayed items is changed.

In response to a "remove" command, the device removes the displays of the second indication associated with the item to be removed, without changing any of the first indications, and without changing any of the displayed items; it also removes the item from the modified list (step S47). An example of the display in step S47 is also shown in FIG. 3D, where the second indication (check mark in the check box) associated with the item "Carl" has been removed. None of the first indications (the thicker border in this example), including the first indication for the item to be removed, is changed, and none of the displayed items is changed.

As a result of adding/removing steps S45, S46 and S47, items in the original selected list will have the first indicators associated with them, and items in the modified list will have the second indicator associated with them. Some items may have both the first and the second indications associated with them because they are in both lists.

The display in step S43 also includes a tool that allows the operator to confirm the modified list, e.g. an "OK" button. Once the operator confirms the modified list, for example by touching the "OK" button (step S45), the device saves the modified list, after having added and/or removed items to/from the initial modified list (step S48). The list that the operator selected in step S42 is not changed.

It can be seen that using the above display method, the original items of the selected list can be distinguished and identified (by the first indications that never change) even when items are added to or removed from the modified list; at the same time, the items in the modified list can also be clearly distinguished and identified (by the second indications which change as the operator adds/removes items). This allows easy addition/removal of items to/from the modified while giving visibility to the original items of the selected list.

It will be apparent to those skilled in the art that various modification and variations can be made in the digital rights management system and method of the present invention without departing from the spirit or scope of the invention. Thus, it is intended that the present invention cover modifications and variations that come within the scope of the appended claims and their equivalents.

What is claimed is:

1. A user interface display method implemented on a computer-controlled device having a display screen and a user input device, comprising:
    (a) storing at least three items available for selection and one or more lists each defining a subset containing at least two of the at least three items;
    (b) in response to a first operator input via the user input device which indicates one of the one or more lists as a selected list, creating a modified list containing at least two initially selected items which are identical to the subset of items defined by the selected list;
    (c) displaying on the display screen the at least three items, at least two first indications each associated with one of the at least two initially selected items, and at least two second indications each associated with one of the at least two initially selected items, wherein each of the at least two initially selected items simultaneously has both a first indication and a second indication associated with it, and each item other than the initially selected items has neither a first indication nor a second indication associated with it;
    (d) receiving a second operator input which indicates either an addition of a selected one of the at least three items to the modified list, or a removal of a selected one of the at least three item from the modified list, or a confirmation of the modified list;
    (e1) if the second operator input indicates an addition, displaying a second indication associated with the selected item, without changing any of the first indications and without changing any of the displayed items, and adding the selected item to the modified list;
    (e2) if the second operator input indicates a removal, removing a display of the second indication associated with the selected item, without changing any of the first indications and without changing any of the displayed items, and removing the selected item from the modified list; and
    (e3) if the second operator input indicates a confirmation, saving the modified list without changing the selected list.

2. The method of claim 1, further comprising, before step (b),
    displaying a request for an operator to select one of the lists; and
    receive the first operator input which selects one of the lists.

3. The method of claim 1, wherein the first indication is a highlight of the associated item.

4. The method of claim 1, wherein the second indication is a checkmark in a checkbox located next to the associated item.

5. The method of claim 1, wherein in step (d), the second operator input is a click or touch of the selected item which is displayed on the screen, wherein if the selected item is currently not in the modified list, the click or touch indicates an addition of the selected item, and if the selected item is currently in the modified list, the click or touch indicates a removal of the selected item.

6. The method of claim 1, wherein the display screen and the user input device are a touch screen.

7. A computer program product comprising a computer usable non-transitory medium having a computer readable program code embedded therein for controlling a data processing apparatus, the data processing apparatus having a display screen and a user input device, the computer readable program code being configured to cause the data processing apparatus to execute a user interface display process which comprises:
    (a) storing at least three items available for selection and one or more lists each defining a subset containing at least two of the at least three items;
    (b) in response to a first operator input via the user input device which indicates one of the one or more lists as a selected list, creating a modified list containing at least two initially selected items which are identical to the subset of items defined by the selected list;
    (c) displaying on the display screen the at least three items, at least two first indications each associated with one of the at least two initially selected items, and at least two second indications each associated with one of the at least two initially selected items, wherein each of the at least two initially selected items simultaneously has both a first indication and a second indication associated with it, and each item other than the initially selected items has neither a first indication nor a second indication associated with it;
    (d) receiving a second operator input which indicates either an addition of a selected one of the at least three items to the modified list, or a removal of a selected one of the at least three item from the modified list, or a confirmation of the modified list;
    (e1) if the second operator input indicates an addition, displaying a second indication associated with the selected item, without changing any of the first indications and without changing any of the displayed items, and adding the selected item to the modified list;
    (e2) if the second operator input indicates a removal, removing a display of the second indication associated with the selected item, without changing any of the first indications and without changing any of the displayed items, and removing the selected item from the modified list; and
    (e3) if the second operator input indicates a confirmation, saving the modified list without changing the selected list.

8. The computer program product of claim 7, wherein the process further comprises, before step (b), displaying a request for an operator to select one of the lists; and receive the first operator input which selects one of the lists.

9. The computer program product of claim 7, wherein the first indication is a highlight of the associated item.

10. The computer program product of claim 7, wherein the second indication is a checkmark in a checkbox located next to the associated item.

11. The computer program product of claim 7, wherein in step (d), the second operator input is a click or touch of the selected item which is displayed on the screen, wherein if the selected item is currently not in the modified list, the click or touch indicates an addition of the selected item, and if the selected item is currently in the modified list, the click or touch indicates a removal of the selected item.

12. The computer program product of claim 7, wherein the display screen and the user input device are a touch screen.

* * * * *